United States Patent
Morita

[11] Patent Number: 5,829,712
[45] Date of Patent: Nov. 3, 1998

[54] MAGNETIC TAPE CASSETTE REEL

[75] Inventor: Kiyoo Morita, Kanagawa, Japan

[73] Assignee: Fuji Photo Film Co., Ltd., Kanagawa, Japan

[21] Appl. No.: 928,544

[22] Filed: Sep. 12, 1997

[30] Foreign Application Priority Data

Sep. 20, 1996 [JP] Japan .................................. 8-250520

[51] Int. Cl.⁶ .................................................. G11B 23/087
[52] U.S. Cl. ........................................ 242/610.6; 242/614
[58] Field of Search ................................ 242/610.6, 614, 242/614.1, 611, 611.1, 345, 908

[56] References Cited

U.S. PATENT DOCUMENTS

| | | |
|---|---|---|
| 4,932,604 | 6/1990 | Maehara et al. . |
| 5,054,709 | 10/1991 | Sato . |
| 5,456,423 | 10/1995 | Sakurai et al. . |
| 5,474,253 | 12/1995 | Kasetty et al. ........................ 242/614 |

FOREIGN PATENT DOCUMENTS

| | | | |
|---|---|---|---|
| 54-4053514 | 4/1979 | Japan | 242/614 |
| 5229740 | 9/1993 | Japan | 242/610.6 |

Primary Examiner—Donald P. Walsh
Assistant Examiner—William A. Rivera
Attorney, Agent, or Firm—McAulay Nissen Goldberg Kiel & Hand, LLP

[57] ABSTRACT

A recessed portion (24) is formed on the upper surface of the lower flange (23). An annular positioning rib (25) is provided on the lower surface of the lower flange (23) so as to be coaxial with the revolving center of the reel main body (20) and so as to be integrated with the lower flange (23). A ventilating hole (26) is provided so as to penetrate the lower flange (23), running through the base end part of the annular positioning rib (25) and the recessed portion (24). The air between the layers of the wound tape can be exhausted via the ventilating hole (26) to the side of the base end part of the annular positioning rib (25) through the recess (24) along the direction of an arrow (B).

4 Claims, 3 Drawing Sheets

FIG. 1 (a) PRIOR ART
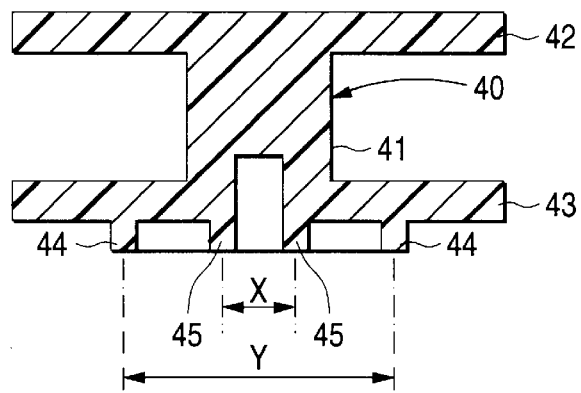
FIG. 1 (b) PRIOR ART
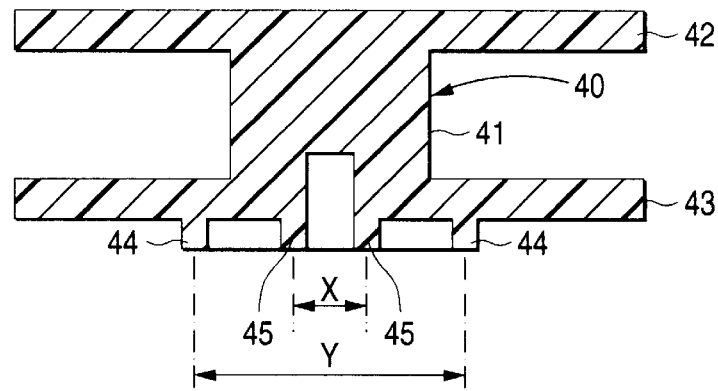
FIG. 1 (c) PRIOR ART
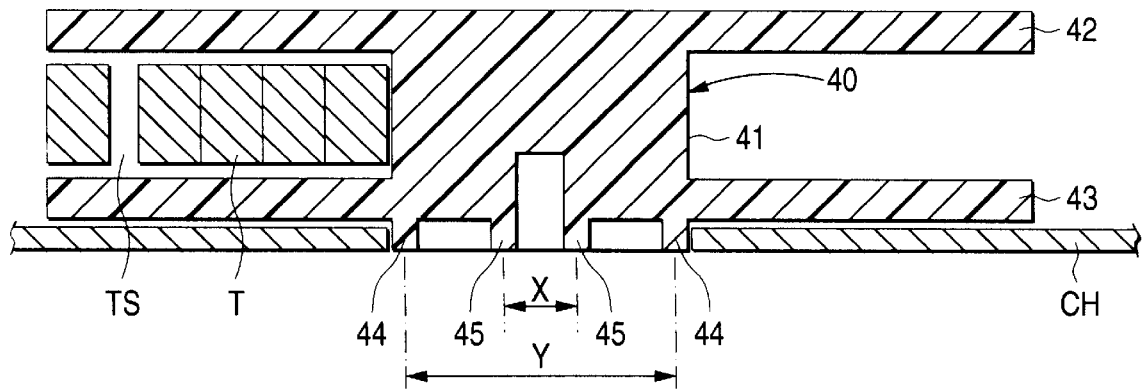

MAGNETIC TAPE CASSETTE REEL

BACKGROUND OF THE INVENTION

The present invention relates to a magnetic tape cassette reel for winding a magnetic tape therearound while the magnetic tape cassette reel is mounted inside a magnetic tape cassette, and specifically relates to a structure of the magnetic tape cassette reel for preventing sink marks from being left on a flange surface and for improving an appearance of the wound tape.

Conventionally, a magnetic tape cassette reel, which winds a magnetic tape around the outer circumferential surface of the reel main body, is known.

FIGS. 1 (a) through (c) show examples of the conventional magnetic tape cassette reel 40, in which reels for professional-use magnetic tape cassettes of different sizes, which are different from one another in the outer diameter of the reel main body 41 and the outer diameter of the flanges 42 and 43.

The reel with the smallest outer diameters shown in FIG. 1(a) is utilized in a cassette known as the S-type cassette for professional-use; in the same way, the reel with the medium outer diameters shown in FIG. 1 (b) is utilized in a cassette known as the M-type cassette for professional-use and the reel with the largest outer diameters shown in FIG. 1 (c) is utilized in a cassette known as the L-type cassette for professional-use.

These reels are driven at the bottom center in FIGS. 1(a)–1(c) by a drive unit (DU) so as to revolve to allow the winding of a magnetic tape (T). In FIG. 1(c), a cross section of the magnetic tape (T) wound on the reel main body and located on left side is schematically illustrated.

Although not shown in FIGS. 1(a)–1(c), at least one recessed portion extending in a radial direction of the reel is provided on at least one side of the flange of the reel around which the tape is wound.

The recessed portion is provided for removing an air, which is accompanied by the winding operation of the tape and hereinafter referred to as air film, in a thin space (TS) between layers of the wound tape. The air film will cause troubles such as unfavorable appearance of the wound tape.

A pair of upper and lower flanges 42 and 43 are provided horizontally in parallel at the top and bottom of the reel main body 41 so as to face each other. The flanges 42 and 43 respectively regulate the widthwise movement (vertical movement in FIGS. 1(a)–1(c) of the magnetic tape when the magnetic tape is wound around the reel main body 41. On the bottom surface of the lower flange 43 in FIGS. 1(a)–1(c), an annular positioning rib 44 and a reference ring 45 are provided. The annular positioning rib 44 and the reference ring 45 of the reels shown in FIGS. 1(a)–1(c) are the same in diameters (X and Y) one another. The annular positioning rib 44 is formed by injection molding to be integrated with the reel main body 44 together with the lower flange 43. The annular positioning rib 44 functions to position the reel main body 41 properly in a magnetic tape cassette (T). The reference ring 45 is utilized to provide a horizontal reference position.

These conventional magnetic tape cassette reels are usually produced by injection molding and there has been a problem of sink marks occurred in the injection process for forming the annular positioning rib 44.

The following describes the sink mark in detail.

The annular rib 44 of the reel shown in FIG. 1(a) or (b) is formed by injection molding simultaneously on a surface of the lower flange 43 in the side on which no magnetic tape is wound, while nothing is formed on a surface of the lower flange 43 on the side on which the magnetic tape is wound. Therefore, unevenness in heat shrink occurs in the vicinity of where the annular rib 44 of the lower flange is formed, and thus irregular recesses or sink marks are generated and left in the vicinity of the position corresponding to the annular rib 44.

The sink marks impair the flatness of the lower flange 43 and cause a wavy movement of the flange surface. The wavy movement causes unfavorable appearance of the wound tape and impairs stable tape feeding when the magnetic tape is wound.

The reel shown in FIG. 1(c), however, as is evident from the figure, the sink marks will not be made and the problem will not occur.

On the other hand, the annular rib is indispensable to positioning onto the cassette half, so that elimination of the annular rib and modification of the position and configuration thereof according to the reel size cannot be taken and thus the sink mark problem has remained unsolved.

SUMMARY OF THE INVENTION

It is an object of the present invention to solve the above-described problem, and particularly to provide a magnetic tape cassette reel in which a favorable appearance of the wound tape and a stable tape feeding is realized by eliminating the air film between the layers of the magnetic tape being wound with high efficiency and by preventing the sink marks from being generated on the rear side of the annular positioning rib provided on the driving-side flange of the reel main body to thereby surely keep flatness of the flange surface and prevent the wavy movement of the flange surface from occurring.

The object can be achieved by a magnetic tape cassette reel, according to the present invention, including a cylindrical hub around which a magnetic tape is wound, and a pair of flanges provided on both end of the cylindrical hub, wherein at least one of the flanges facing a drive unit (DU) side is made of plastic, the magnetic tape cassette reel comprising:

an annular rib provided along the entire circumference on a drive unit side of the plastic flange so as to be coaxial with the cylindrical hub and to be fit into an opening provided on a cassette half;

at least one recessed portion provided on one side opposite to the drive unit side of the plastic flange so as to extend in a radial direction; and a ventilating hole provided on the annular rib and communicated with the recessed portion for penetrating the plastic flange.

With the construction of the magnetic tape cassette cartridge according to the present invention, the air film can be exhausted effectively to the outside immediately through the ventilating hole after passing the recessed portion.

Since a thin wall structure is realized by provision of the ventilating hole in the annular rib, unevenness in heat shrink occurs little in the vicinity of where the annular rib of the plastic flange is formed by injection molding, and thus no irregular recesses or no sink marks are left in the vicinity of the position which corresponds to the annular rib on the surface of the plastic flange whereon the magnetic tape is wound.

BRIEF DESCRIPTION OF THE DRAWINGS

FIG. 1 is a sectional drawing showing a conventional magnetic tape cassette reel;

DETAILED DESCRIPTION OF THE PREFERRED EMBODIMENTS

A magnetic tape cassette reel of one embodiment according to the present invention is described below with references to drawings.

Figure 2:
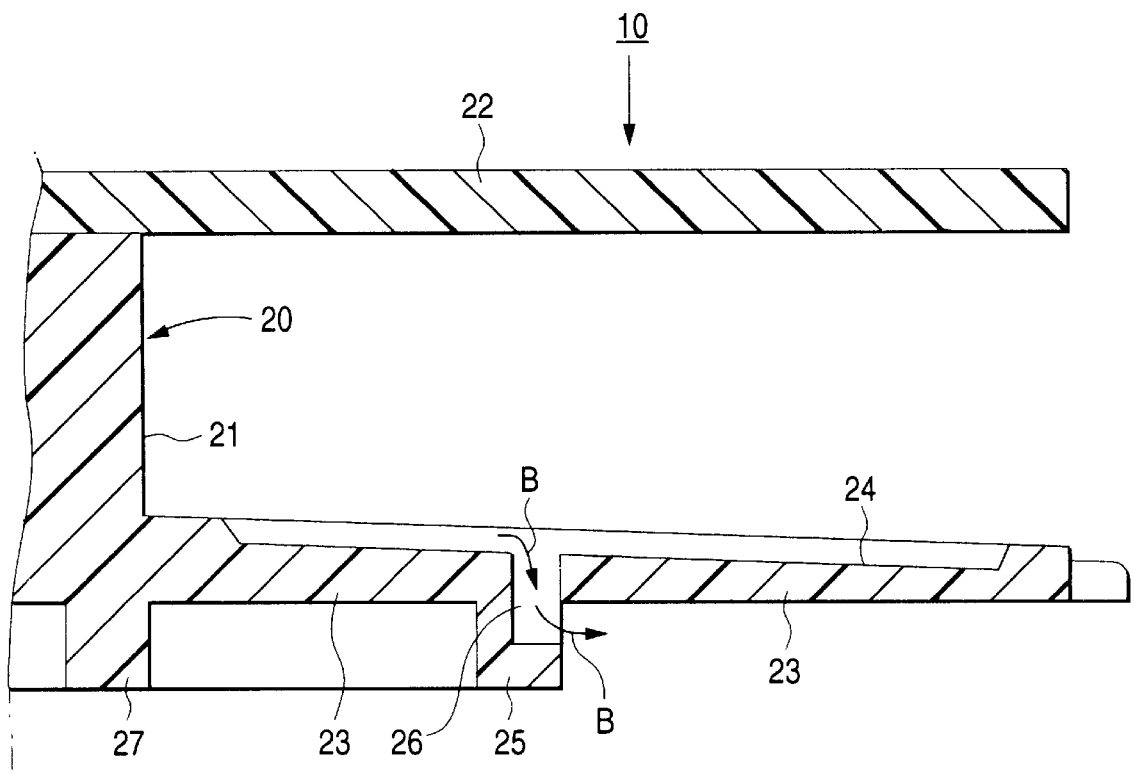
FIG. 2 is a sectional drawing showing a part of the magnetic tape cassette reel as an embodiment of the present invention.
Figure 3:
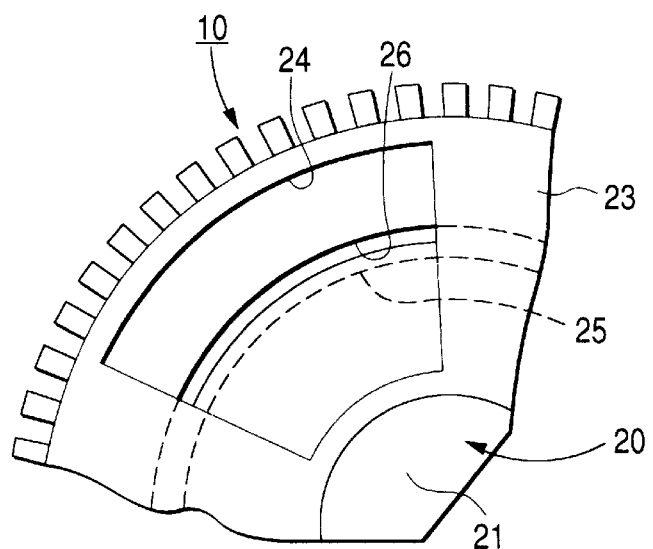
FIG. 3 is a plane showing a part of the lower flange of the magnetic tape cassette reel in FIG. 2.
Figure 4:
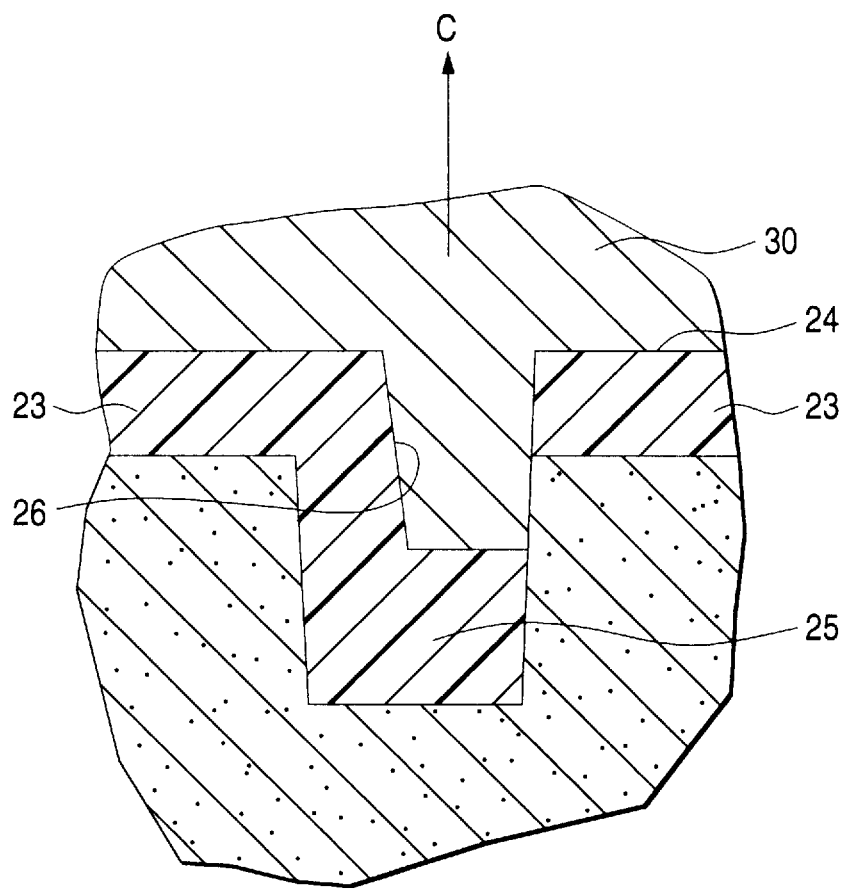
FIG. 4 is a sectional drawing showing a part of the annular positioning rib of the magnetic tape cassette reel in FIG. 2 and the metal molds for the injection forming of the annular positioning rib.

FIG. 2 is a sectional drawing showing a part of the magnetic tape cassette reel as the embodiment of the present invention and FIG. 3 is a plane showing a part of the lower flange of the magnetic tape cassette reel in FIG. 2. FIG. 4 is a sectional drawing showing a part of the annular positioning rib of the magnetic tape cassette reel in FIG. 2 and the metal molds for the injection forming of the annular positioning rib.

In FIGS. 2 and 3, a magnetic tape cassette reel 10 is mounted inside a magnetic tape cassette which is not shown in the figures and a magnetic tape (not shown in the figures) are wound around the reel main body 20.

The reel main body 20 which is formed so that the magnetic tape can be wound around an outer circumferential surface 21 is driven to revolve by a drive unit which is not shown in the figures from one side in the widthwise direction of the magnetic tape being wound (i.e., from the lower side in FIG. 2).

A pair of flanges 22 and 23, upper and lower, are provided on both the widthwise ends of the magnetic tape on the reel main body 20 (i.e., the top and bottom end parts in FIG. 2) so as to face each other along the widthwise direction (i.e., a vertical direction in FIG. 2) of the magnetic tape. The flanges 22 and 23 respectively control the widthwise movement of the magnetic tape being wound on the reel main body 20.

At least one recessed portion 24 is formed on the upper surface of the lower flange 23 in FIG. 2, which faces the upper flange 22, along the revolving direction of the reel main body 20. The recessed portion 24 function as a path of the air film caught between the layers of the magnetic tape wound around the reel main body 20.

An annular positioning rib 25 is provided on the lower surface of the lower flange 23 in FIG. 2 so as to be coaxial with the revolving center of the reel main body 20 and so as to be integrated with the lower flange 23. The annular positioning rib 25 is formed by the injection molding of an integrated body of the reel main body 20 which incorporates the lower flange 23 through utilization of the metal mold 30 for injection forming shown in FIG. 4, without an "under-cut" and this is available with a simple molding system. The annular positioning rib 25 is fit to the cassette half (not shown in the figure) of the magnetic tape cassette so as to position the reel main body 20 onto the magnetic tape cassette.

A ventilating hole 26 is provided at the base end part of the annular positioning rib 25. The ventilating hole 26 penetrates the lower flange 23, running through the base end part of the annular positioning rib 25 and the recessed portion 24. By the provision of the ventilating hole 26, the air film (i.e. an air generated and accompanied at a thin space between layers of the wound tape while the tape is being wound) is exhausted to the side of the base end part of the annular positioning rib 25 through the recessed portion 24 along the direction indicated by an arrow B.

FIG. 2 shows a reference ring 27 for providing the a horizontal reference position. The reference ring 27 is provided on the lower surface of the lower flange 23 and inside the annular positioning rib 25 (i.e. the left side in FIG. 2) so as to be incorporated with the lower flange 23.

In addition, an arrow C in FIG. 4 indicates the direction to release the movable metal mold 30 after the annular positioning rib 25 and the ventilating hole 26 is molded. As shown in FIG. 4, the ventilating hole 26 is formed into a trapezoid shape in a cross section, in such a manner that the lower flange 23 with the ventilating hole 26 can be formed by injection molding without the under-cut.

Since the magnetic tape cassette cartridge according to the present invention comprises the cylindrical hub around which the magnetic tape is wound, a pair of flanges provided on both end of the hub, wherein at least one flange that faces the drive unit side is made of plastic, at least one recessed portion provided on at least one side of the plastic flange so as to extend in the radial direction, whereon the tape is wound, the annular rib provided along the entire circumference on the drive unit side of the plastic flange so as to be coaxial with the cylindrical hub and to fit to the opening provided on the cassette half, and the ventilating hole provided on such rib so as to run through the recessed portion, the air film can be exhausted effectively to the outside immediately through the ventilating hole after passing the recessed portion.

Since the thin wall structure is realized by provision of the ventilating hole in the annular rib, unevenness in heat shrink occurs little in the vicinity of where the annular rib of the plastic flange is formed by injection molding, and thus no irregular recesses or no sink marks are left in the vicinity of the position which corresponds to the annular rib on the surface of the plastic flange whereon the magnetic tape is wound.

Therefore, the problem of the sink marks that impair the flatness of the plastic flange and cause the wavy movement of the flange surface will not arise.

Consequently, the problem of the unfavorable appearance of the wound tape and the impairment of the stable tape feeding when the magnetic tape is wound will not arise.

Since the present invention provides a ventilating hole onto the annular rib which is an essential element of the magnetic tape cassette reel but involves a problem of sink marks causing such as unfavorable appearance of the wound tape, air film removal function and the sink mark preventive function can be simultaneously given to the magnetic tape cassette.

What is claimed is:

1. A magnetic tape cassette reel including a cylindrical hub around which a magnetic tape is wound, and a pair of flanges provided on both end of the cylindrical hub, wherein at least one of the flanges facing a drive unit (DU) side is made of plastic, the magnetic tape cassette reel comprising:

an annular rib provided along the entire circumference on a drive unit side of the plastic flange so as to be coaxial with the cylindrical hub and to be fit into an opening provided on a cassette half;

at least one recessed portion provided on one side opposite to the drive unit side of the plastic flange so as to extend in a radial direction; and a ventilating hole provided on the annular rib and communicated with the recessed portion for penetrating the plastic flange.

2. The magnetic tape cassette reel according to claim 1, in which said ventilating hole is so shaped that the lower flange is formed by injection molding without an under-cut.

3. The magnetic tape cassette reel according to claim 2, in which the ventilating hole is formed into a trapezoid shape in a cross section.

4. The magnetic tape cassette reel according to claim 1, in which said annular rib is integrally formed by the injection molding of the plastic flange without an under-cut.

* * * * *